(12) United States Patent
Alvarez Saavedra et al.

(10) Patent No.: US 10,983,058 B1
(45) Date of Patent: Apr. 20, 2021

(54) DEVICE AND METHOD FOR VISUALIZATION OF FLUOROPHORES

(71) Applicant: Amplyus LLC, Cambridge, MA (US)

(72) Inventors: Ezequiel Alvarez Saavedra, Cambridge, MA (US); Sebastian Kraves, Somerville, MA (US)

(73) Assignee: AMPLYUS LLC, Cambridge, MA (US)

( * ) Notice: Subject to any disclaimer, the term of this patent is extended or adjusted under 35 U.S.C. 154(b) by 214 days.

(21) Appl. No.: 16/355,152

(22) Filed: Mar. 15, 2019

Related U.S. Application Data

(60) Provisional application No. 62/643,170, filed on Mar. 15, 2018.

(51) Int. Cl.
    *G01N 21/64* (2006.01)

(52) U.S. Cl.
    CPC ..... *G01N 21/6447* (2013.01); *G01N 21/6428* (2013.01); *G01N 21/6452* (2013.01)

(58) Field of Classification Search
    CPC ........... G01N 21/6447; G01N 21/6428; G01N 21/6452
    See application file for complete search history.

(56) References Cited

U.S. PATENT DOCUMENTS

| | | | |
|---|---|---|---|
| 8,974,651 B2 * | 3/2015 | Chan | G01N 27/44721 |
| | | | 204/461 |
| 2015/0030542 A1 * | 1/2015 | Singhal | A61K 49/0034 |
| | | | 424/9.6 |

OTHER PUBLICATIONS

Komatsu et al. ("Evaluation of Enzymatic Activities in Living Systems with Small-Molecular Fluorescent Substarte Probes", Analytical Sciences, Apr. 2015, vol. 31, pp. 257-265) (Year: 2015).*

* cited by examiner

*Primary Examiner* — David P Porta
*Assistant Examiner* — Meenakshi S Sahu
(74) *Attorney, Agent, or Firm* — AKC Patents LLC; Aliki K. Collins

(57) ABSTRACT

A device and method are described for the naked eye visualization of fluorophores. The device has a light source capable of exciting fluorophores, a rack to receive one or more fluorophores and a window through which test tubes can be observed. The method provides a means for inferring the conformational state of molecules from the amount of fluorescence emitted by the fluorophores.

19 Claims, 3 Drawing Sheets

DEVICE AND METHOD FOR VISUALIZATION OF FLUOROPHORES

The present application claims priority from provisional application No. 62/643,170 filed Mar. 15, 2018 with the title "Visualization of conformational changes in biomolecules using the naked eye" and listing Ezequiel Alvarez Saavedra and Sebastian Kraves as inventors. This application is incorporated herein by reference in its entirety.

TECHNICAL FIELD

The present invention relates to a device for the visualization of fluorophores, and the use of the device to study the conformational state of biomolecules. More particularly, the device allows for the visualization of fluorophores over time using the naked eye, or with the aid of an imaging device.

BACKGROUND ART

The molecular structures of nucleic acids, proteins, and other biological molecules have profound implications for their biological functions and have been the subject of studies for decades in research laboratories. Fluorescence provides an observable method for the detection and quantification of biological molecules, and can also provide information on the conformational state of a biological molecule. For example, the conformational state of the green fluorescent protein (GFP) can be inferred from its fluorescence emission, which dims as the protein loses its native three-dimensional structure. Nucleic acids are a class of biomolecules that can be detected and quantified through their interaction with fluorophores. Moreover, changes in the structure of DNA and/or RNA can be detected through the use of small molecule dyes that fluoresce specifically when bound to the double stranded form of DNA, or more generally that fluoresce only when bound to nucleic acids in one of their conformational states, single stranded (ss) or double stranded (ds), but not the other. While the uses of fluorescence in the study of biomolecules are broad, the methods used to detect fluorescence emitted by biological molecules or associated fluorophores involve complex techniques or costly apparatus such as charge-coupled devices, fluorometers, and transilluminators which are generally aimed at the detection (absence or presence) of molecules and/or their quantification (concentration or mass). In educational and low resource settings, which require low-cost and easy-to-use methods, such methodologies are time- and resource onerous, limiting their applicability. Furthermore, existing methods and devices for the fluorescent detection of biological molecules are typically designed for their detection in a single conformational state, for example during electrophoretic separation on a gel matrix (usually agarose or polyacrylamide). There is, however, a dearth of simple methods for the dynamic study of the three-dimensional structures of biological molecules, specifically the study of the physical and chemical forces that confer biomolecules such as nucleic acids and proteins their three dimensional structures and associated biological properties. A simple and inexpensive device which allows the instant visualization by the unaided eye of fluorescence associated with biological molecules in solution, and which enables the dynamic observation of changes in the three-dimensional structure of biomolecules following chemical and physical perturbations, offers significant advantages over the prior art for the study of biomolecules in educational contexts and for applied biotechnology.

SUMMARY OF THE EMBODIMENTS

In accordance with one embodiment of the invention, a fluorophore visualization device is described for the naked eye visualization and/or imaging of fluorophores. The device includes a first chamber defined by a set of walls including a horizontally disposed top, a front wall, and a floor. The walls of the chamber are opaque. The top wall of the chamber has one or more openings for removably receiving one or more test tubes. The test tubes include fluorophore containing compositions, which emit light at longer wavelengths upon excitation by light at shorter wavelengths. The front wall of the chamber includes a first window positioned so that the test tubes can be observed through the window. A light source providing excitation light is positioned within the chamber. The excitation light excites the fluorophores, causing them to emit light, which can be seen through the window, thereby enabling the fluorophores to be observed by the naked eye. The light source is so positioned in the chamber that it cannot normally be directly observed when the test tube is viewed through the window. The excitation light source has an excitation spectral pattern, and the fluorophores have an emission spectral pattern.

In some embodiments the light source is positioned on the floor near the front wall.

In some embodiments the first chamber includes a rack configured to removably receive a plurality of test tubes and the light source includes an array of LEDs positioned to illuminate the plurality of test tubes.

In accordance with another embodiment of the invention, the first chamber is disposed within an outer chamber. In this embodiment, the outer chamber has (i) a second window, positioned so as to overlap the first window and to permit the test tube to be observed through the first and second windows, and (ii) a canopy that overhangs the first chamber in a region including the second window, so that the first and second windows are shaded from light external to the chambers.

In some embodiments the rack includes slots for N test tubes, N≥3, and the array includes N LEDs, with one LED disposed opposite to each corresponding slot. In some embodiments a battery for powering the array of LEDs is positioned within a compartment that is disposed in the outer chamber, between the first chamber and a wall of the outer chamber.

In some embodiments, a filter is used to attenuate light within the excitation spectral pattern while transmitting light within the emission spectral pattern. The filter is positioned between the viewer and the test tubes, and may, for example, be positioned in the first window, in the second window, or between the first window and the second window. The filter may also be worn as eyewear, including safety goggles and eyeglasses. Alternatively, the filter may be a feature of the digital camera used to image the test tubes through the first window and the second window.

In some embodiments, a thermal energy element is positioned in the first chamber, in order to heat or cool the chamber. For heating, the thermal energy element could be a resistive heating element, a thermocouple, or other heating means. For cooling, the thermal energy element can be a refrigeration unit, a thermocouple, or other cooling means. In a preferred embodiment, the thermal energy element is a thermocouple based device using the thermoelectric (Peltier) effect.

In other embodiments the temperature of the device can be controlled by placing the entire device in a temperature controlled environment.

In some embodiments, a camera capable of imaging in the visible frequency range from about 380 nm to about 740 nm can be positioned to capture images through the first window and the second window, of the test tubes disposed in the first chamber.

In another embodiment, a method is described of visualizing fluorescence emitted by fluorophores, the method including the steps of:
1. Providing a device for the naked eye visualization of fluorophores according to the embodiments described above.
2. Inserting one or more fluorophore-containing test tubes in slots in the rack.
3. Turning on the light source.
4. Monitoring the tubes by viewing and/or imaging through the first and second windows.
5. Determining an initial brightness of the fluorophore.

In a further embodiment, a method is described that includes monitoring the tubes over time and determining changes in brightness over time. Control test tubes of unchanging brightness can be used along with tubes that change brightness over time in order to allow changes to be more clearly identified. In one embodiment, the tubes are initially heated and then placed in the first chamber, and the fluorescence is monitored over time as the tubes cool. In this manner, renaturation and temperature-dependent enzymatic processes can be monitored, for example.

In another embodiment, a thermal energy element placed in the first chamber is used to increase or decrease the temperature of the tubes in the chamber, allowing changes in fluorescence to be monitored as the tubes are heated and/or cooled.

In some embodiments, methods are described wherein the fluorophore includes at least one fluorescent enzyme substrate.

In further embodiments, methods are described wherein the fluorophore brightness changes when it associates with specific biomolecules.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1A:
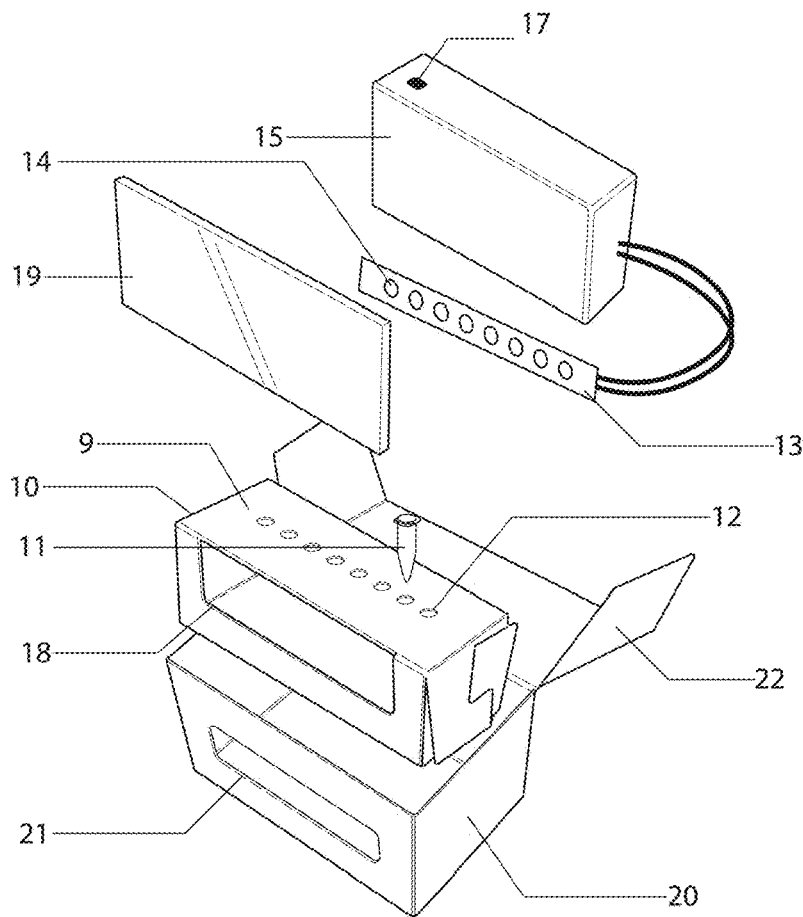
FIG. 1A is an exploded view of the device.

The study of biological molecules has benefited greatly from the use of fluorescence. The 2008 Nobel Prize in Chemistry was awarded for the discovery and development of the green fluorescent protein. This and other developments in fluorescence detection have allowed scientists to visualize proteins in their native context in living animals. Additional developments in fluorescence detection have enabled the study of biological molecules ex vivo through the use of fluorophores. Aided by the use of fluorescence readers or transilluminators, fluorophores that associate with biological molecules such as DNA, RNA, phospholipids, and proteins can reveal the presence, relative abundance, conformational state, and other properties of biological molecules.

As understood herein, the detection of the conformational status of biological molecules, and changes in their structures such as those induced by changes in environmental conditions including temperature, pH, and salt concentration, is not afforded by methods currently available in educational settings. Herein is provided a system and method suitable for such educational settings for the direct observation of fluorescence emitted by biological molecules in solution, either in a single conformational state, or dynamically over time as biological molecules undergo conformational changes, for example those induced by alterations of temperature, salt, pH or other physico-chemical perturbations.

The present invention allows the visualization by the unaided eye of fluorescence intrinsic to biological molecules in solution or of fluorescence conferred to biological molecules by the addition of fluorophores, allowing the observer to directly visualize fluctuations in fluorescence that reveal changes in the conformational state and quantity of the biological molecules. Additionally, the invention bestows an observer the ability to infer the relative abundance of biological molecules in different samples.

Definitions. As used in this description and the accompanying claims, the following terms shall have the meanings indicated, unless the context otherwise requires:

A "wall" of a chamber is any part of the chamber that defines a boundary with the rest of the world, such a side wall, a floor, a front wall, a rear wall, and a ceiling.

A "canopy" of an outer chamber is an overhanging region of the top wall or ceiling of the outer chamber and the two side walls of the outer chamber that extends over the windows of the inner chamber and the outer chamber, and blocks light from above the windows from entering the windows.

A "test tube" is a vessel that can contain liquid, is transparent to light, and can hold a volume of no greater than about 3 milliliters.

"LED" is an abbreviation for light-emitting diode.

An "array of LEDs" is a configuration of a plurality of light-emitting diodes connected to operate from a common power source.

An "excitation spectral pattern," of a light source is the distribution of energy as a function of frequency of light from the light source.

An "emission spectral pattern," of a fluorophore is the distribution of energy as a function of frequency of the light emitted by the fluorophore.

"Fluorescence" is the property of absorbing light of given wavelength and emitting light of longer wavelength.

"Fluorophores" are molecules with the property of fluorescence

"Biological molecules" or "biomolecules" are molecules such as DNA, RNA, proteins, carbohydrates and lipids that are produced by an organism or produced synthetically in resemblance to molecules produced by an organism.

"Nucleic acids" are complex organic substances present in living cells, especially DNA or RNA, whose molecules consist of many nucleotides linked in a long chain.

"DNA" is an abbreviation for deoxyribonucleic acid, a self-replicating material which is present in nearly all living organisms.

"RNA" is an abbreviation for ribonucleic acid, a nucleic acid present in all living cells. Its principal role is to act as a messenger carrying instructions from DNA for controlling the synthesis of proteins.

A "conformational state" is a specific spatial arrangement of the atoms of a molecule with regard to other atoms of the same molecule or with regard to other molecules.

"Native three-dimensional structure" is the stable conformational state of a biological molecule under conditions found in a living organism.

"Transilluminator" is a device for monitoring the fluorescence of a fluorophore composition by shining excitation light from one side of the composition and monitoring emitted light from the opposite side of the composition. With a transilluminator, excitation light and emitted light are parallel, and filters are used to attenuate the excited light so that the emitted light can be more clearly visualized.

"Electrophoretic separation" or "Electrophoresis" is a means of separating charged molecules from one another by means of an applied electric field.

A "thermal energy element" is an element that can transfer thermal energy into or out of a system. As such, a thermal energy element can be a heating element, a cooling element, or an element that can both heat and cool.

Figure 1B:
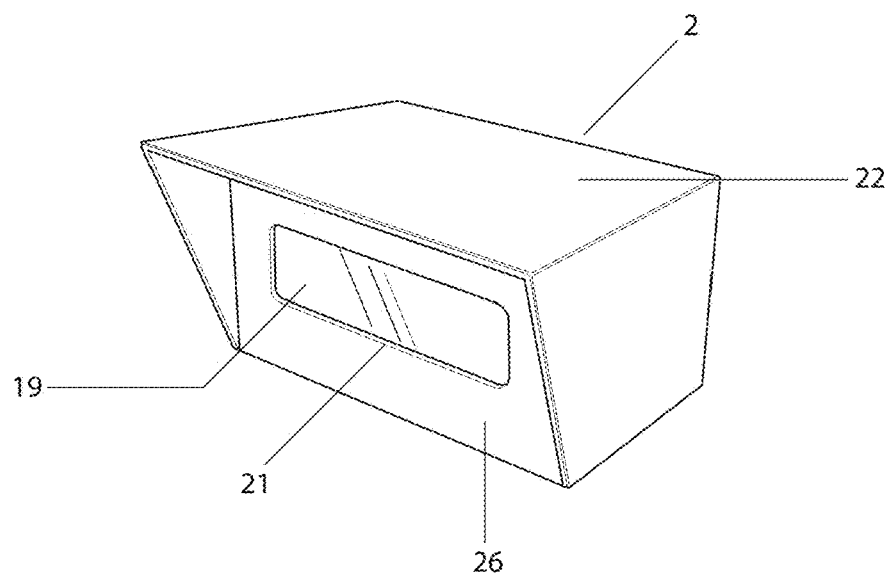
FIG. 1B is a perspective view of the device with the lid closed.
Figure 1C:
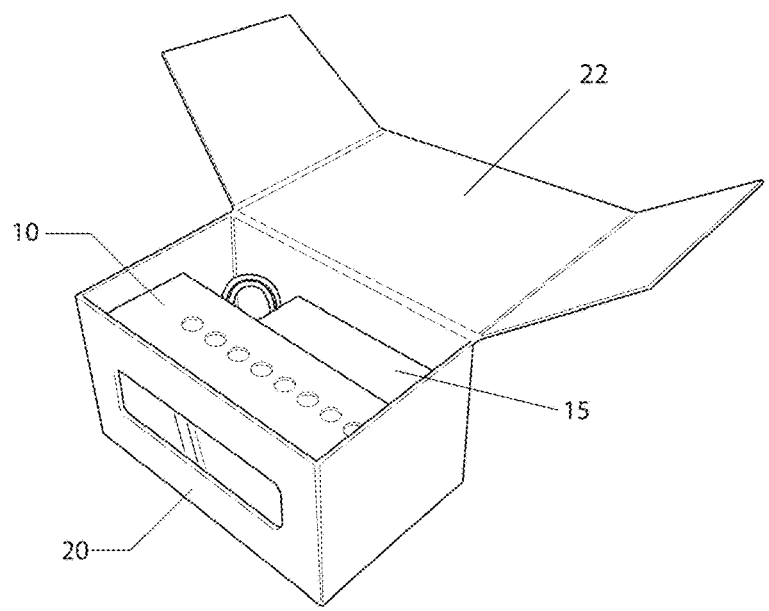
FIG. 1C is a perspective view of the device with the lid open.

FIGS. 1A, 1B and 1C, show a preferred embodiment of the device (2) of the invention. A rack (9) disposed on a first chamber (10) is able to hold a plurality of test tubes (11). The test tubes (11) may contain samples consisting of dissolved biological molecules that are intrinsically fluorescent, or samples consisting of biological molecules that display affinity for fluorophores also present in the sample. The rack (9) provides an array of circular openings (12) that conform to the diameter of the test tube. In a preferred embodiment, the rack openings accommodate test tubes (11) of 200 microliter volume. In other embodiments the circular openings (12) may be larger and fit test tubes of 500 microliter, 2 milliliter, or slightly larger capacity. In other embodiments, the circular openings (12) may be otherwise geometrically optimized to fit the test tubes (11). In some embodiments, only the top portion of the test tubes (11) remains above the plane of the rack (9), while the majority of the body of each test tube (11) is disposed inside the first chamber (10), including the portion of the test tubes containing the samples.

The first chamber (10) has a darkened interior and opaque walls. Internal to the first chamber (10), one or more light sources (13), each consisting of an array of LEDs illuminate the test tubes (11). The light source may in some embodiments be a single LED (14). The light source (13) is arranged in opposition to the test tubes such that light from the array of LEDs is directly incident on the test tubes. In some embodiments the light source (13) may be positioned along the floor of the first chamber, whilst in other possible embodiments the light source (13) may be attached to a different wall. The light source (13) has an excitation spectral pattern optimized to result in excitation of the fluorophores present in the test tubes.

As shown in FIG. 1C, a battery (15) for powering the light source (13) may be directly juxtaposed to the first chamber (10). In some embodiments, the battery is contained within an outer chamber (20), and juxtaposed between a wall of the first chamber and a wall of the outer chamber. The battery (15) may for example be a standard nine-volt battery. The battery may further be equipped with an on-off switch (17) to turn the light source on or off. In a preferred embodiment, the outer chamber (20) further comprises a canopy (22) serving as a lid to close the device (2) shut. The canopy (22) also serves to protect the test tubes (11) from ambient light, such that the device (2) can be used under standard environmental conditions without the need for a dark room. The canopy (22) overhangs the outer chamber (20).

Figure 2A:
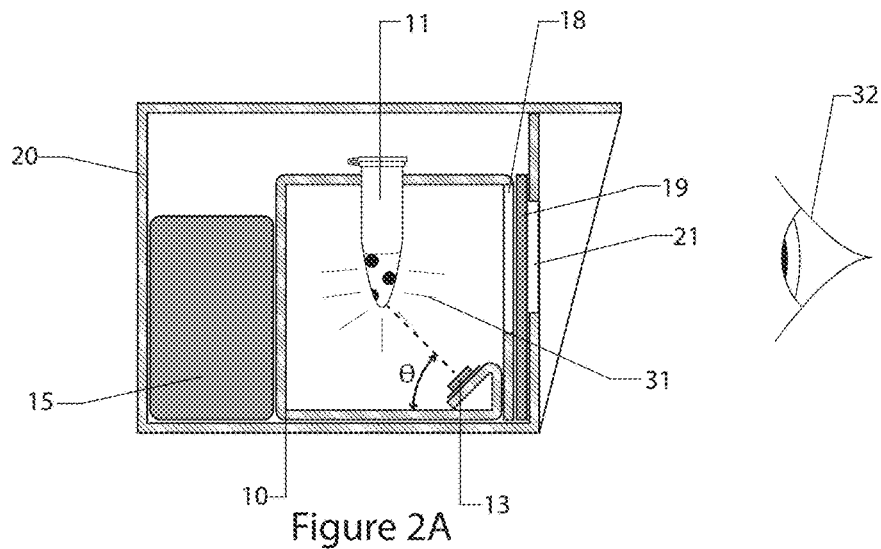
FIG. 2A is a cross-section view showing the internal components of the device.

In the embodiment shown, the first chamber (10) has a first viewing window (18) and the outer chamber has a second viewing window (21). The two viewing windows overlap and thereby provide a viewing area for observing fluorescent light emitted by the test tubes (11). As shown in FIG. 2A, the path of incident light from the light source (13) is at an angle θ from a plane formed by the floor of the first chamber, such that light is aimed at the test tubes and not directly at the observer or observers, where e is between about 15° and 90°. This configuration is in contrast to the configuration of a transilluminator, where light is directed through a sample, and directly towards the viewer. For a transilluminator, the angle corresponds to 180°. For a transilluminator, the light from the excitation source must be blocked by filters in order to reduce background and avoid potential damage to the viewer's eyes.

Figure 2B:
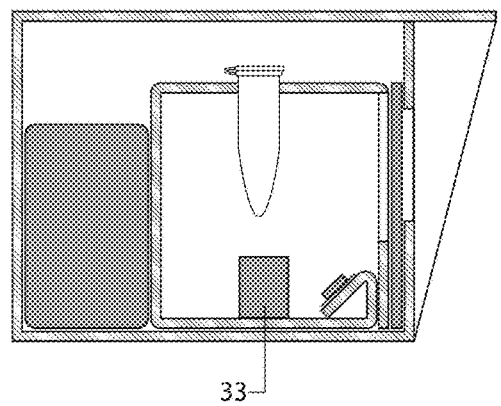
FIG. 2B is a cross-section view showing the internal components of the device with a heating/cooling element.

As shown in FIG. 2B, a thermal energy element (33) may also be included in the first chamber, and may be used to heat and/or cool the test tube (11), for example in order to change the conformation of biomolecules in the test tube (11), which can be visualized by fluorescence changes, or to influence enzymatic reactions that can be monitored by fluorescence.

Figure 3:
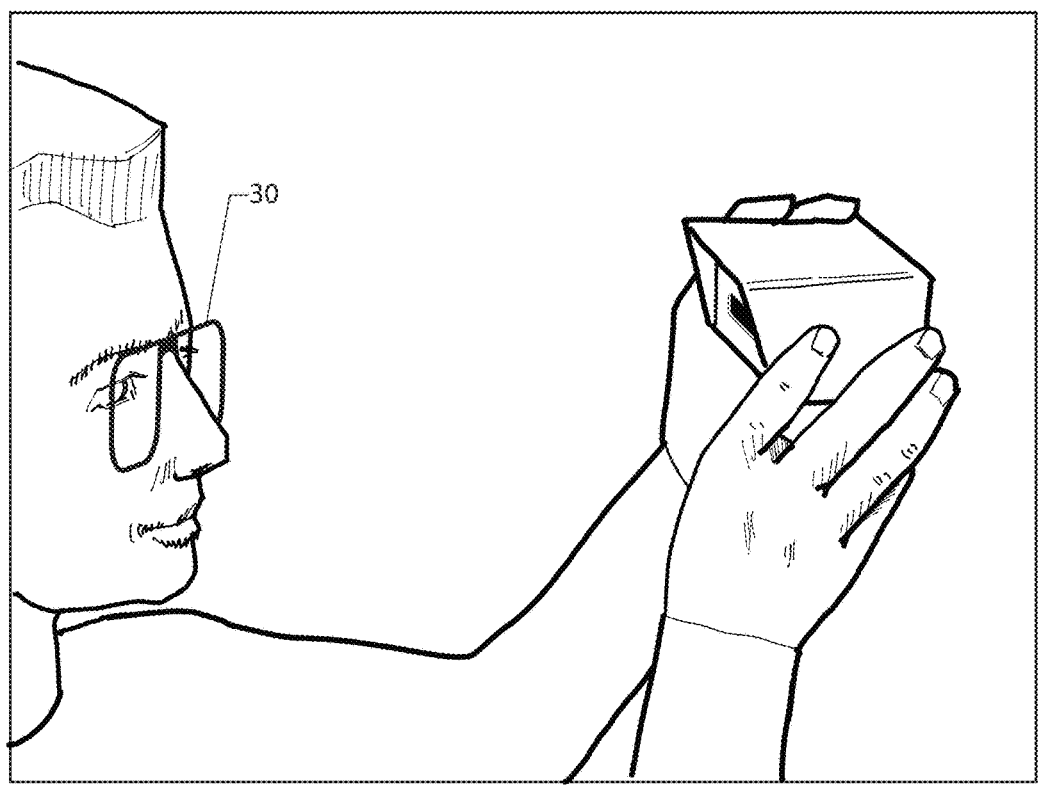
FIG. 3 shows how a user would normally hold the device at eye level.

As shown in FIG. 3, in a preferred embodiment, the device (2) is of a compact size and fits comfortably in the hands of the viewer, and provides the viewer with a clear view of the test tubes (11) within the first chamber (10) of the device. In some embodiments, the viewer may be outfitted with eyewear (30), for example safety goggles or glasses with filter elements.

As shown in FIG. 1B, a filter (19) may be used through which the test tubes can be viewed or recorded with a camera. As shown in FIG. 1B, the filter (19) is positioned between the viewer and the test tubes, and may, for example, be positioned in the first window (18), in the second window (21), or between the first window (18) and the second window (21). In another embodiment, a filter may be integrated into the lenses of eyewear (30). The purpose of the filter (19) is to eliminate stray radiation at the excitation wavelengths, and to further improve the signal to noise. The filter (19) is configured to attenuate light within the excitation spectral pattern while transmitting light within the emission spectral pattern of the fluorophores.

The canopy (22) overhangs the outer chamber in a region including the first window (18) and the second window (21), so that the first window (18) and the second window (21) are shaded from light external to the first chamber (10). Blocking ambient light may be important even if a filter (19) is used because full spectrum light may not be effectively filtered by the filter (19) and may illuminate the first chamber (10), making it more difficult to observe the fluorescence.

Figure 4A:
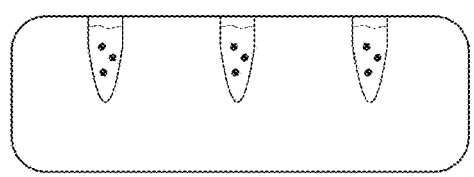
FIGS. 4A-4C show examples of fluorescence intensity as apparent to the naked eye.
Figure 4B:
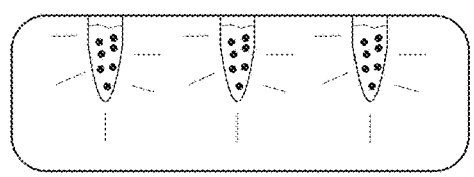
Figure 4C:
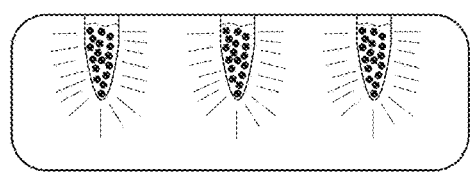

As illustrated in FIGS. 4A-4C, by visualizing fluorescence through the windows an observer can assess the presence of fluorophores inside the first chamber (10) and compare their relative abundance. In FIGS. 4A-4C, the number of lines extending from the tubes represents the relative fluorescent intensity emanating from the tubes. FIG.

4A thus represents a situation where few active fluorophores are present and little fluorescence intensity may be monitored. In FIG. 4B, an intermediate fluorescence intensity is monitored and in FIG. 4C, a high amount of intensity can be monitored.

In one embodiment, FIGS. 4A-4C could thus represent a time-course where a dye such as SYBR® Green that fluoresces in the presence of duplex DNA is present in solution. FIG. 4A would correspond to a higher temperature where all DNA in solution is denatured, FIG. 4B would correspond to an intermediate temperature where half of the DNA is reannealed, and FIG. 4C would correspond to a lower temperature where the DNA is fully duplex.

Fluorophores may be intrinsically fluorescent biomolecules, such as the green fluorescent protein, fluorescently labeled biomolecules, or inorganic molecules that selectively fluoresce following specific interactions with biomolecules. An observer may also visualize changes in fluorescence over time, such as those that occur, for example, during changes in the conformational states of intrinsically fluorescent biomolecules or the association of fluorophores with biomolecules. Such changes may happen in a number of molecular interactions of interest to the observer. In one example, a non-fluorescent substrate is processed by an enzyme resulting in the release of fluorophores, whereby the observer can assess enzyme activity. In another example application, two strands of DNA combine to form a double stranded DNA (dsDNA) molecule in the presence of fluorophores with specific affinity for dsDNA, enabling the observer to study changes in the conformational state of DNA. In yet other example applications, fluorescent proteins may be synthesized inside the test tubes, enabling the experimentalist to assess the rate of protein production. During these applications, fluorescence may also be recorded with the aid of a digital camera.

As described above, a thermal energy element (33) may be located within the first chamber (10) to control the temperature of the contents of the test tubes. Heating and cooling the contents of the tubes is important to study changes in biomolecule structure and chemical rate of reaction as a function of temperature. Methods that can be carried out in this device such as the ones described below may benefit from changes in temperature, for example if the molecules accelerate or decelerate their interactions with fluorophores as they are heated or cooled. These and other applications of the device in the study of biological molecules are further described below.

In some embodiments, methods are described to study DNA structure. DNA strands are polymers of four types of nucleotides, each containing a unique nitrogenous base, adenine (A), thymine (T), cytosine (C) or guanine (G). DNA exists mainly in two conformational states, double-stranded DNA (dsDNA) and single-stranded DNA (ssDNA), the most common being dsDNA. dsDNA strands are held together by non-covalent bonds, termed hydrogen bonds, that are formed between complementary nitrogenous bases on opposite strands. A pairs with T and C pairs with G. Certain dsDNA binding dyes such as AccuClear®, AccuBlue®, AccuGreen™, QuantiFluor® and SYBR® Green will fluoresce only when bound to dsDNA, and not ssDNA. When a solution containing dsDNA is heated above a certain temperature, the hydrogen bonds holding the two DNA strands are disrupted, with a resulting decrease in the fluorescence emitted by dsDNA binding dyes. Conversely, when a solution containing ssDNA is cooled, dsDNA can be formed; when this occurs in the presence of dsDNA-binding dyes, an increase in fluorescence is observed indicating the change in conformational state from ssDNA to dsDNA. The device described in this embodiment is thus useful to study conformational changes in DNA from ssDNA to dsDNA while actively (as shown in FIG. 2B) or passively (as shown in FIG. 2A) cooling DNA samples, and changes from dsDNA to ssDNA when heating the samples (as shown in FIG. 2B), by directly visualizing changes in fluorescence intensity (as shown in FIGS. 3 and 4).

In one embodiment, a user will heat the contents of the tubes (11) using a device such as a water bath, heat block, or other, and place the heated tubes in the openings (12) of the first chamber (10). The temperature of the tubes (11) will passively decrease over time until it equilibrates at room temperature. Over this cooling period, the user can study the effect of temperature changes on the conformational state of DNA by directly observing changes in fluorescence intensity (FIGS. 4A-4C).

In another embodiment of the device, as shown in FIG. 2B, a thermal energy element (33) is located within the first chamber (10) to control the temperature of the test tubes. The thermal energy element (33) may consist of a thin-film, resistive heater, a thermoelectric device, or other methods that use convection, conduction or radiation to change the temperature of the chamber. Certain embodiments containing heating and/or cooling elements may additionally lend themselves to the fluorescent detection by the naked eye of nucleic acid amplification from a DNA template, such as occurs during the polymerase chain reaction or during isothermal amplification. Methods like the ones described are useful ways to demonstrate changes in the conformational state of DNA, to detect the presence or absence of dsDNA in a sample, to observe synthesis or degradation of dsDNA, and in general to detect dsDNA.

Probes that fluoresce when bound to ssDNA but not to dsDNA can be used in a complementary way to the method described above to detect presence of ssDNA in a sample, or to measure the activity of helicases, enzymes that catalyze the transition of dsDNA to ssDNA at physiological temperatures.

In another method, the properties of DNA base pairing can be examined. It is well known that the DNA bases adenine (A) and thymine (T) have high affinity for each other and that cytosine (C) and guanine (G) have high affinity for each other, and that AT pairs are held together by two hydrogen bonds and CG pairs by three hydrogen bonds. Because the number of bonds holding CG base pairs is larger than the number of bonds holding AT base pairs a larger amount of energy is required to disrupt CG base pairs than AT base pairs. Therefore, when dsDNA molecules are heated, higher temperatures are required to disrupt base pairing in sequences with high CG base pair content than in sequences with high AT base pair content, given that the molecules have the same total number of base pairs. The temperature at which the DNA strands are half denatured, meaning half double-stranded and half single-stranded, is generally referred to as the melting temperature (Tm). In the embodiment shown in FIG. 2B, as samples are placed in the rack and temperature is gradually increased by action of the heating element (33), fluorescence in samples containing double-stranded, AT-rich DNA and a dsDNA-specific fluorescent dye will decrease at a faster rate than in samples containing CG-rich sequences. This difference allows an observer (32) to infer differences in the base composition of DNA molecules and serves to demonstrate the different properties of DNA base pairs. In embodiments lacking a heating element, such as that shown in FIG. 2A, when samples that were previously heated past their melting temperatures are placed in the rack (9) and allowed to passively cool below their melting temperatures, samples containing GC-rich sequences will regain fluorescence faster than samples containing AT-rich sequences. This difference allows an observer (32) to infer differences in the base composition of DNA molecules and serves to demonstrate the different properties of DNA base pairs.

In another method, the rules of nucleic acid base pairing can be tested. It is well known that complementary nucleobases display high affinity for each other, while non-complementary nucleobases do not. For example, the complementary DNA bases adenine (A) and thymine (T) have high affinity for each other, as do the complementary DNA bases cytosine (C) and guanine (G). Complementary nucleobases can form base pairs when encountered in opposite strands of a DNA or RNA molecule, promoting the formation of double stranded nucleic acids. Conversely, non-complementary nucleobases such as A and C will not promote base pairing or the formation of double stranded nucleic acids. In this method, one single stranded oligonucleotide of single base composition (e.g., oligo-A) is mixed in a test tube (11) with another oligonucleotide of single base composition (e.g., oligo-T) in the presence of a fluorophore that is a DNA stain with selective affinity for dsDNA. When the test tube is placed in the rack (9) and the light source (13) is turned on, an observer (32) looking through the window (21) can confirm the occurrence of base pairing as an increase in fluorescence caused by the formation of double-stranded DNA. If the test tube contains non-complementary single-stranded oligonucleotides, no fluorescence is observed. The presence or absence of fluorescence therefore allows an observer to infer differences in the affinity of single stranded oligonucleotides and serves to demonstrate base pairing rules. In an extension of this method, oligonucleotides of unknown composition may be interrogated by their mixing with known oligonucleotides in order to infer the base composition of the unknown.

In another method, the hybridization of nucleic acids can be assayed. Single-stranded nucleic acids of a certain base composition are mixed with single stranded nucleic acids of a different base composition inside a test tube (11) in the presence of a fluorophore that is a DNA stain with selective affinity for dsDNA. In one embodiment, the test tube is placed in the rack (9) and the light source (13) is turned on, and an observer (32) looks through the window (21) while the sample is gradually heated by action of the heating element (33). A gradual decrease in fluorescence is observed as double-stranded DNA becomes single-stranded, until the sample is heated sufficiently for fluorescence to extinguish. The observer can thus infer the melting temperature of each sample and make comparisons regarding the relative affinities of the nucleic acids. In a different embodiment, the test tubes are heated outside the device, past the melting temperatures of the samples, before their placement in the rack (9). While in the rack, passive cooling of the samples allows dsDNA to form, resulting in a gradual increase in fluorescence that the observer can compare across samples to deduce the relative affinity of each sample. In a variation of this method, a single nucleic acid species is present in each sample and the method serves to evaluate their degree of self-complementarity.

Another method can reveal the activity of a DNA polymerase during DNA synthesis. Standard procedures for assaying DNA polymerase activity involve the use of fluorophores that are selective dsDNA binding dyes. The sample consists of the dsDNA binding dye mixed with a first nucleic acid that acts as a template for replication and a second nucleic acid that is partially complementary to the template and serves as a primer for DNA replication. The sample is completed by the addition of a DNA polymerase to be assayed and free nucleotides. The sample is mixed in a test tube and placed in the rack (9) and the light source (13) is turned on, such that an observer (32) looking through the window (21) can confirm the occurrence of DNA synthesis as evidenced by an increase in fluorescence caused by the extension of the primer by DNA polymerase activity, forming dsDNA.

Another method can reveal the activity of a nuclease. Nucleases are enzymes that play essential roles in the removal of damaged DNA and in providing proof-reading activity during DNA replication, among other central functions, as well as having a wide range of biotechnology applications. Standard procedures for assaying nuclease activity involve the use of radiolabeled nucleotides and the detection of degradation products after resolving them electrophoretically in a gel matrix. In this method, fluorophores that are selective dsDNA binding dyes are used to assay DNAase activity. The sample consists of the dsDNA binding dye mixed with a double-stranded DNA sample and the nuclease to be assayed. The sample is mixed in a test tube and placed in the rack (9) and the light source (13) is turned on, such that an observer (32) looking through the window (21) can visualize the baseline fluorescence at the initial time point. As the double stranded DNA is degraded by the nuclease, fluorescence decreases. In a variation of this method, protection from nuclease activity may be assayed as the failure to observe a decrease in fluorescence.

In another method, the presence and relative quantity of a DNA amplification product is assayed in the device after the polymerase chain reaction (PCR) or isothermal amplification. It is advantageous in diagnostics and other biotechnology applications to detect and quantify a target nucleic acid sequence. Standard methods involve amplification of the target sequence using PCR or isothermal methods, however detection of the amplification products requires time-consuming or complex techniques such as the use of gel electrophoresis or quantitative-PCR instruments. In this method, amplification of a target nucleic acid is performed using standard techniques in the presence of a dsDNA binding fluorophore. Following amplification in a standard PCR thermal cycler or isothermal amplification device, samples are placed in the device as shown in FIG. 2A and the relative fluorescence of different samples is assessed by the observer (32). Thus direct visual detection can serve to confirm presence of the amplification product and its relative abundance in individual samples. Observations can be repeated at various times during the amplification process, as samples can be removably placed in the rack and returned to the PCR thermalcycler or isothermal amplification device at various intervals. In a variation of this method, a thermal energy element (33) directly enables amplification of the target nucleic acid within the device itself.

Intrinsically fluorescent biomolecules such as the green fluorescent protein emit fluorescence when illuminated with light within the excitation spectral pattern and when they are in their native state. When the native state is disrupted, fluorescence typically decreases or disappears. The native state of fluorescent proteins in general, including the green fluorescent protein and other fluorescent proteins such as Azurite, Sapphire, CFP, RFP, YFP, mCherry and mStrawberry may be disrupted under a variety of conditions including high or low temperatures, ionic concentration and pH, and the presence of denaturing agents such as detergents, alcohols and heavy metals resulting in loss of fluorescence.

The device described in this invention may be used to examine how different physical or chemical conditions alter protein structure through changes in fluorescence. In one method, the effect of more than one physical or chemical change can be simultaneously studied. In another method changes to the structural stability molecules can be studied, for example by altering the temperature in the first chamber and changing the pH in the test tube. In other methods, interactions between a non-fluorescent molecule and a fluorescent biomolecule can be examined by observing changes in fluorescence.

In one method, the device described in this invention can be used to estimate the concentration of a fluorophore in a sample. A set of reference samples of known and different concentrations of fluorophore is placed in the rack of the first chamber next to a test tube containing an unknown concentration of fluorophore. The concentration is estimated by finding a reference sample with similar fluorescence intensity. This same method can be used to determine the concentration of fluorescent biomolecules.

In another method, the device described in this invention is used to determine the activity of an enzyme. Enzymes accelerate reactions so that a substrate is converted to product in a shorter amount of time when an enzyme is present than when it is not. Test tubes containing the necessary components to enable an enzymatic reaction where either the substrate or the product of the reaction has fluorescent properties are placed in the device and monitored over time for changes in the intensity of fluorescence. Visualization of variations in fluorescence with the naked eye allows for the qualitative assessment of enzyme activity. For example, enzyme activity can be inferred from the rate of decrease of fluorescence in a reaction where the substrate but not the product is fluorescent, or the rate of increase in fluorescence where the product but not the substrate is fluorescent. In addition, the effect of physical and chemical perturbations on enzyme activity can be studied. For example the effect of variables such as temperature, pH and inhibitors of enzyme activity can be inferred through the observation of changes in the rate of change of fluorescence before and after a change in the variable.

In another method, the device described in this invention is used to monitor the synthesis of ribonucleic acid (RNA) through the use of RNA binding molecules that fluoresce only when bound to RNA strands. Test tubes containing the necessary components to enable biosynthesis of RNA are placed in the device and monitored over time for appearance of fluorescence that suggests RNA molecules are present in the solution. Visualization of variations in fluorescence with the naked eye allows for the semiquantitative assessment of RNA production.

In another method, the device described in this invention can be used to monitor the synthesis of proteins. Test tubes containing the necessary components to enable biosynthesis of intrinsically fluorescent proteins are placed in the device and monitored over time. Appearance of fluorescence is an indicator for the synthesis of the intrinsically fluorescent protein. In a variation of this method an agent that affects the conformational state of proteins is also added to the test tubes and the effect on the protein is monitored through changes in fluorescence. Visualization of variations in fluorescence with the naked eye allows for the qualitative assessment of protein production.

In a similar method, test tubes containing the necessary components to enable biosynthesis of proteins and a fluorophore that fluoresces only when bound to or is altered by specific proteins are placed in the device and monitored over time. Appearance of fluorescence is an indicator of the synthesis of the protein of interest. In a variation of this method an agent that affects the conformational state of proteins is also added to the test tubes and the effect on the protein monitored through changes in fluorescence.

In another method, the device is used to determine whether a molecule of interest is present in a given sample. A first antibody with high affinity to the molecule of interest is immobilized against the inside of the test tube surface and incubated with the said sample so that if molecules of interest are present in the sample they will become bound to the first antibody. A second antibody with high affinity for the molecule of interest is added to the test tubes and incubated so that, if present, all or the majority of the molecules of interest will become coated with the second antibody. A third enzyme-labeled antibody with high affinity for at least two sites in the second antibody is added to amplify the number of molecules ultimately bound to the molecule of interest. The contents of the tube are then washed as to remove any unbound antibodies and a substrate for the enzyme linked to the third antibody is added. This substrate is typically non-fluorescent but the product of the enzymatic reaction is. The test tubes are then placed inside the device described in this invention and observed for changes in fluorescence to reveal whether the molecule of interest was present in the sample.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A device for visualization, using the naked eye, of fluorophores, the device comprising:
    a first chamber defined by a set of walls including a horizontally disposed top, a front wall, and a floor, the walls being opaque, the top having an opening configured to removably receive a test tube inserted therein, the test tube containing a composition in which the fluorophores can be observed, wherein the front wall includes a first window positioned so that the test tube can be observed therethrough;
    a light source disposed in the first chamber, the light source so positioned in the first chamber that it cannot normally be observed when the test tube is viewed through the window; and
    a thermal energy element positioned in the first chamber, for changing the temperature of the first chamber.

2. A device according to claim 1, further comprising:
    an outer chamber in which the first chamber is disposed, the outer chamber having (i) a second window, positioned so as to overlap the first window and to permit the test tube to be observed through the first and second windows, and (ii) a canopy that overhangs the first chamber in a region including the second window, so that the first and second windows are shaded from light external to the chamber.

3. A device according to claim 1, wherein a path of incident light from the light source to the test tube is disposed at an angle $\theta$ from a plane formed by the floor of the test tube, where e is between about 15° and about 90°.

4. A device according to claim 1, wherein the first chamber includes a rack configured to removably receive a plurality of test tubes and the light source includes an array of LEDs positioned to illuminate the plurality of test tubes.

5. A device according to claim 4, wherein the rack includes slots for N test tubes, N≥3, and the array includes N LEDs, with one LED disposed opposite to each corresponding slot.

6. A device according to claim 2, further comprising a compartment, disposed in the outer chamber, between the first chamber and a wall of the outer chamber, configured to hold a battery to power the light source.

7. A device according to claim 1, wherein the light source has an excitation spectral pattern, and the fluorophores have an emission spectral pattern, the device further comprising a filter, through which the test tube is viewed, the filter configured to attenuate light within the excitation spectral pattern while transmitting light within the emission spectral pattern, the filter being disposed in the first window, or as a component of eyewear worn by the viewer.

8. A method of visualizing fluorescence emitted by fluorophores, the method comprising:
providing a device according to claim 1;
providing a set of test tubes for containing fluorophores;
placing the set of test tubes in a rack of the device;
viewing the tubes under a set of user-specified conditions through the first window of the device when the light source is powered, wherein the set of user-specified conditions includes the temperature; and
transferring of heat to or from the first chamber.

9. A method according to claim 8 wherein the fluorophores comprise at least one fluorescent enzyme substrate.

10. A method of visualizing fluorescence emitted by fluorophores, the method comprising:
providing a device according to claim 1;
providing a set of test tubes for containing fluorophores;
placing the set of test tubes in a rack of the device;
viewing the tubes under a set of user-specified conditions through the first window of the device when the light source is powered;
wherein the fluorophore brightness changes when it associates with specific biomolecules.

11. The device of claim 4 further comprising:
a camera configured for imaging in the frequency range of 380 nm to 740 nm, positioned to capture images, through the first window, of the test tubes disposed in the first chamber.

12. A device according to claim 11, wherein the light source has an excitation spectral pattern, and the fluorophores have an emission spectral pattern, the device further comprising a filter, through which the test tube is viewed, the filter configured to attenuate light within the excitation spectral pattern while transmitting light within the emission spectral pattern, the filter being disposed in the first window, or as a feature of the camera.

13. A method of imaging fluorescence emitted by fluorophores, the method comprising:
providing a device according to claim 12;
providing a set of test tubes for containing fluorophores;
placing the set of test tubes in the rack of the device;
imaging the tubes with the camera under a set of user-specified conditions through the first window of the device when the light source is powered, wherein the set of user—specified conditions includes the temperature; and
transferring of heat to or from the first chamber.

14. A method according to claim 13 wherein the fluorophores comprise at least one fluorescent enzyme substrate.

15. A method of imaging fluorescence emitted by fluorophores, the method comprising:
providing a device according to claim 12;
providing a set of test tubes for containing fluorophores;
placing the set of test tubes in the rack of the device;
imaging the tubes with the camera under a set of user-specified conditions through the first window of the device when the light source is powered;
wherein the fluorophore brightness changes when it associates with specific biomolecules.

16. A system for visualization of fluorophores, the system comprising:
a chamber defined by a set of walls including a horizontally disposed top, a front wall, and a floor, the walls being opaque, the top having an opening configured to removably receive a test tube inserted therein, the test tube containing a composition in which the fluorophores can be observed, wherein the front wall includes a window positioned; and
a light source disposed in the chamber, the light source so positioned in the chamber that it cannot normally be observed when the test tube is viewed through the window;
a camera disposed with respect to the window so as to receive light emitted from the fluorophores, wherein the emitted light contains frequencies in the range of 380 nm to 740 nm, and wherein camera is capable of sensing frequencies in the range of 380 nm to 740 nm; and
wherein the fluorophore brightness changes when it associates with specific biomolecules.

17. A system according to claim 16, wherein the chamber includes a rack configured to removably receive a plurality of test tubes and the light source includes an array of LEDs positioned to illuminate the plurality of test tubes.

18. A system according to claim 16, wherein the light source has an excitation spectral pattern, and the fluorophores have an emission spectral pattern, the system further comprising a filter, through which the test tube is viewed, the filter configured to attenuate light within the excitation spectral pattern while transmitting light within the emission spectral pattern.

19. A device for visualization, using the naked eye, of fluorophores, the device comprising:
a first chamber defined by a set of walls including a horizontally disposed top, a front wall, and a floor, the walls being opaque, the top having an opening configured to removably receive a test tube inserted therein, the test tube containing a composition in which the fluorophores can be observed, wherein the front wall includes a first window positioned so that the test tube can be observed therethrough;
a light source disposed in the first chamber, the light source so positioned in the first chamber that it cannot normally be observed when the test tube is viewed through the window; and
wherein the fluorophore brightness changes when it associates with specific biomolecules.

* * * * *